(12) United States Patent
Nett et al.

(10) Patent No.: US 8,938,958 B2
(45) Date of Patent: Jan. 27, 2015

(54) HYDRAULIC ARRANGEMENT FOR THE ACTIVATION OF TWO ACTUATORS

(75) Inventors: Hans-Peter Nett, Adenau (DE); Harwin Niessen, Huerth (DE); Jan Potulski, Cologne (DE)

(73) Assignee: GETRAG Driveline Systems GmbH, Cologne (DE)

(*) Notice: Subject to any disclaimer, the term of this patent is extended or adjusted under 35 U.S.C. 154(b) by 1902 days.

(21) Appl. No.: 11/958,323

(22) Filed: Dec. 17, 2007

(65) Prior Publication Data

US 2008/0149408 A1 Jun. 26, 2008

(30) Foreign Application Priority Data

Dec. 18, 2006 (DE) .......................... 10 2006 061 516

(51) Int. Cl.
| | |
|---|---|
| *F15B 11/16* | (2006.01) |
| *F16D 25/10* | (2006.01) |
| *F16D 48/02* | (2006.01) |
| *B60K 23/04* | (2006.01) |

(52) U.S. Cl.
CPC ............... *B60K 23/04* (2013.01); *F15B 11/16* (2013.01); *F16D 48/0206* (2013.01); *F15B 2211/20538* (2013.01); *F15B 2211/20561* (2013.01); *F15B 2211/6313* (2013.01); *F15B 2211/7052* (2013.01); *F15B 2211/71* (2013.01); *F15B 2211/78* (2013.01); *F16D 2500/1026* (2013.01); *F16D 2500/10425* (2013.01); *F16D 2500/3024* (2013.01)
USPC ................... 60/477; 192/48.601; 192/48.609; 192/85.63

(58) Field of Classification Search
CPC .................. F16D 48/0206; F16D 2500/1027; F15B 2211/783
USPC ................... 60/477, 484; 192/48.604, 48.605, 192/48.612, 48.613, 87.14, 85.63, 48.9, 49, 192/48.91, 48.609, 48.601
See application file for complete search history.

(56) References Cited

U.S. PATENT DOCUMENTS

| | | | | |
|---|---|---|---|---|
| 2,389,498 A | * | 11/1945 | Gates | .............................. 475/27 |
| 2,635,427 A | * | 4/1953 | Baugh et al. | ..................... 60/475 |
| 2,902,004 A | * | 9/1959 | Zarnack | .......................... 60/455 |
| 3,774,696 A | * | 11/1973 | Horsch | ........................ 172/812 |
| 3,864,911 A | * | 2/1975 | Gellatly et al. | .................. 60/430 |
| 4,681,180 A | * | 7/1987 | Oyama et al. | ................... 180/76 |
| 5,141,072 A | | 8/1992 | Shibahata | |
| 5,149,285 A | * | 9/1992 | Kinoshita | ................... 440/61 R |
| 5,454,762 A | | 10/1995 | Sawase et al. | |
| 6,094,910 A | * | 8/2000 | Vatne | .............................. 60/416 |
| 7,434,393 B2 | * | 10/2008 | Hesse | .............................. 60/422 |
| 7,832,540 B2 | * | 11/2010 | Quehenberger et al. | ... 192/85.31 |
| 2008/0190729 A1 | * | 8/2008 | Stehr et al. | ................... 192/85 R |

FOREIGN PATENT DOCUMENTS

| | | |
|---|---|---|
| DE | 4017454 C2 | 12/1990 |
| DE | 69220921 T2 | 7/1997 |
| WO | WO 2005/064187 A1 | 7/2005 |
| WO | WO 2006/002450 A1 | 1/2006 |
| WO | WO 2006128637 A1 * | 12/2006 |

* cited by examiner

*Primary Examiner* — Gene Crawford
*Assistant Examiner* — Terry Chau
(74) *Attorney, Agent, or Firm* — Knobbe Martens Olson & Bear, LLP (57) ABSTRACT

A hydraulic arrangement for the activation of two actuators, with a hydraulic pressure supply unit which is assigned jointly to the two actuators. The pressure supply unit is designed to be reversible in its direction of action, so that, depending on the direction of action, in each case only one of the actuators is driven.

17 Claims, 4 Drawing Sheets

HYDRAULIC ARRANGEMENT FOR THE ACTIVATION OF TWO ACTUATORS

CROSS-REFERENCE TO RELATED APPLICATIONS

This application claims the priority of German patent application DE 10 2006 161 516 filed Dec. 18, 2006.

BACKGROUND OF THE INVENTION

The present invention relates to a hydraulic arrangement for the activation of two actuators, with a hydraulic pressure supply unit which is assigned jointly to the two actuators.

In the prior art, various hydraulic arrangements are known which serve for performing technical functions with the aid of actuators. For example, hydraulic shift devices may be mentioned, which serve for the actuation of clutches in a motor vehicle.

In conventional motor vehicles, the drive force, that is to say the transferred drive torque, is generally distributed equally to the two wheels of an axle. In this case, the drive torque is distributed to the wheels of an axle normally by means of a mechanical differential. These differentials of a driven axle which are arranged between the left and the right driving wheel ensure, during cornering, that the path difference between the right and the left driving wheel is compensated. The drive torque is in this case always conducted to the wheel which can transfer less drive force to the road.

Furthermore, systems are known in which the drive torque to be transferred to the wheels can be distributed variably. Controlled clutches can in each case freely vary the torque transferred to a wheel independently of the wheel on the other side and can thus influence the driving dynamics of the vehicle.

By the directed distribution of the torques to the two wheels of an axle becoming possible in this way, action can be taken actively upon the yawing moment of the vehicle. By means of this yawing moment, for example, an understeering or an oversteering of the vehicle can be actively counteracted. The driving safety can thereby be increased, particularly when this system is coupled to a four-wheel drive. Systems of this type are also designated as active-yaw systems.

Furthermore, there are devices for torque distribution, in which a rotational speed error is generated between the left and the right wheel by means of two clutches. The active yaw control can thereby be improved even further, since account can be taken of the fact that the respective bend-outside wheel covers a greater distance and therefore possesses a higher rotational speed than the bend-inside wheel.

Such a device for controlling the drive power of a motor vehicle with a four-wheel drive is known from DE 40 17 454 C2 (U.S. Pat. No. 5,141,072). The drive torque can be distributed variably to the rear wheels via two clutches. In this case, hydraulic multiple-disc clutches are employed, which are supplied alternately with hydraulic pressure by means of a hydraulic and electronic control. In this case, a hydraulic pump is connected to the clutches via a corresponding switchable valve arrangement.

A similar concept for regulating the right-side and left-side drive forces is known from DE 692 20 921 T2 (U.S. Pat. No. 5,454,762).

The active set-up of a rotational speed difference between the left and the right wheel requires suitable step-up devices, such as wheel sets, etc. These step-up devices are designed such that either one wheel or else the other wheel can possess a higher rotational speed, but never both wheels. This is because the latter could result in damage to the step-up devices and/or in damage to a power-split gear between driven axles of a four-wheel drive vehicle.

The known hydraulic solutions for clutch activation operate with activated valves and partly with pressure accumulators. These components signify a high economic outlay, a high space requirement in the vehicle and a high weight of the overall system.

BRIEF SUMMARY OF THE INVENTION

The object on which the invention is based, therefore, is to provide a simpler hydraulic activation system, particularly for controlling the torque distribution between two driven wheels of an axle.

This object is achieved, according to one aspect of the invention, by means of a hydraulic arrangement for the activation of two actuators, with a hydraulic pressure supply unit which is assigned jointly to the two actuators, the pressure supply unit being designed to be reversible in its direction of action, so that, depending on the direction of action, in each case only one of the actuators is driven.

A device of this type provides for compact and therefore cost-effective hydraulic activation for two actuators. One drive source is used for operating two actuators. On account of the possibility of reversing the direction of action, complicated valve arrangements for alternate activation are not necessary. In general, the hydraulic arrangement according to the invention is suitable for use in axle drive units in which a rotational speed difference can actively be set up between the wheels.

In general, the hydraulic arrangement according to the invention is also suitable for active-yaw systems in which no rotational speed differences are set up.

According to a second aspect of the invention, the above object is achieved by means of a device for controlling the torque distribution in a drive train of a motor vehicle between two driven wheels of an axle by means of two clutches, to which in each case an actuator operated by a drive source is assigned, there being provided for both actuators a joint drive source which is designed to be reversible in its direction of action, so that, depending on the direction of action, in each case only one of the actuators is driven.

A device of this type provides for a compact and therefore cost-effective control of the torque distribution to the wheels of a drive axle in a drive train. This is achieved in that a single drive source is used in order to operate two actuators and clutches connected to them.

Preferably, according to the second aspect of the invention, the device for controlling the torque distribution is designed with a hydraulic arrangement for the activation of two actuators according to the first aspect of the invention.

As a result, the advantages of a hydraulic circuit, that is to say the efficient force transmission, together with the above-mentioned advantages of a common drive source which is designed to be reversible in its direction of action, can be utilized.

According to a preferred embodiment of the first aspect of the invention, the pressure supply unit is designed as a hydraulic pump.

This affords the advantage of simple and efficient force transmission from the pressure supply unit to the actuators.

According to a further embodiment, the hydraulic pump is designed as a bidirectional hydraulic pump in which the delivery side and the suction side are interchangeable.

This embodiment affords the particular advantage that only one clutch can be activated at any time point. Thus, the situation which is critical in terms of safety and in which there is a simultaneous activation of two clutches is ruled out as a consequence of the system of the particular embodiment.

According to a particularly preferred embodiment, the pressure supply unit is driven by an electric motor, with the result that a particularly accurate activation of the pressure supply unit is possible.

Furthermore, it is advantageous if the reversal in direction of action of the drive source takes place by means of the reversal in direction of rotation of the electric motor.

By virtue of this embodiment, a particularly rapid activation and particularly rapid reversal in direction of rotation of the drive source are possible.

Furthermore, overall, it is advantageous if the electric motor is controlled by an electrical control unit, so that even complex automatic control sequences can be implemented.

According to a particularly advantageous embodiment, the hydraulic pressure generated by the hydraulic pump is measured by pressure transducers, so that the actuators can be activated effectively.

Overall, it is particularly advantageous if the hydraulic pressure generated by the hydraulic pump is feed-back controlled by means of an electrical control unit.

This affords the possibility of acting directly upon force transmission from the pressure supply unit to the actuators, which takes place via the hydraulic pressure.

It is in this case preferable if the hydraulic pressure generated by the hydraulic pump is indirectly feed-back controlled via the rotational speed of the electric motor. This is possible cost-effectively by means of rotational speed sensors.

It is in this case particularly advantageous if the hydraulic pressure generated by the hydraulic pump is indirectly feed-back controlled via the torque of the electric motor.

This is particularly advantageous since the torque of the electric motor is, as a rule, directly proportional to the hydraulic pressure generated.

In a further embodiment, the hydraulic pressure generated by the hydraulic pump is indirectly feed-back controlled via the electrical current of the electric motor.

This automatic control is advantageous since the electrical current of the electric motor can be detected and controlled at low outlay in technical terms and is proportional to the torque of the electric motor.

In a particularly preferred embodiment, the hydraulic pump is connected to two symmetrical hydraulic circuits.

A particularly simple feed-back control of the hydraulic arrangement is thereby possible.

In a further embodiment, the actuators are designed as piston/cylinder units.

This variation makes it possible efficiently to transfer the hydraulic pressure generated by the hydraulic pump to, for example, a clutch.

It is particularly preferable to connect the hydraulic pump to valve arrangements which in each case connect the hydraulic pump in a first position to the respective actuator and in a second position to an oil sump.

This arrangement ensures that the hydraulic pump, on the one hand, supplies an actuator with hydraulic pressure and, on the other hand, sucks a sufficient quantity of hydraulic oil in from the oil sump.

In a particular embodiment, the valve arrangements are designed as directional valves, with the result that simple and compact hydraulic switching is implemented.

Preferably, the valve arrangements are designed to be directly actuable hydraulically, with the result that, for example, an electrical control and electromagnetic converters connected to it may be dispensed with.

In one possible embodiment, in the position of rest, the valve arrangements connect the hydraulic pump to the actuators.

By virtue of this variation, the hydraulic pressure generated by the hydraulic pump is transferred quickly to the actuators, without being delayed by time-consuming switching operations.

According to a preferred embodiment, the hydraulic pressure which is fed to a respective actuator in one of the two hydraulic circuits is fed back to a valve arrangement which is assigned to the other hydraulic circuit.

This embodiment makes it possible to alternately connect the hydraulic pump to one of the actuators and to an oil sump as a function of the direction of rotation of the pump. Furthermore, the valve arrangements can thereby be directly (that is to say hydraulically) actuated alternately.

In a further preferred variation of the invention, the fed-back hydraulic pressure switches the respective valve arrangement into the second position, so that the hydraulic pump is connected to the oil sump.

By virtue of this variation, too, an electronic control or automatic control and the additional actuators associated with this may be dispensed with.

Preferably, the hydraulic pressure necessary for switching the directional valves is lower than the hydraulic pressure fed to the actuators for activation.

What is achieved thereby is that, even in the case of a very slight rise of hydraulic pressure in one of the hydraulic circuits, the hydraulic pump is connected on the suction side to the oil sump and is thus supplied with a sufficient quantity of hydraulic oil.

In an alternative embodiment of the second aspect of the invention, the drive source is designed as an electrical energy source. This embodiment has the advantage that a particularly rapid changeover of the direction of action can be achieved.

In this embodiment, it may prove advantageous if the actuators are designed as electromagnetic actuators.

Hydraulic circuits may thereby be dispensed with completely.

It is particularly advantageous if the distribution of electrical energy to the electromagnetic actuators is controlled by an electrical control unit.

It thereby becomes possible that even highly complex automatic control operations can be implemented.

Overall, therefore, an axle subassembly for an axle of a motor vehicle can be implemented, which has two driven wheels, with means for generating a rotational speed difference between the wheels, which have two clutches which can be actuated alternately, and with a device for controlling the distribution of torque to the wheels according to the second aspect of the invention.

This axle subassembly may be implemented with a clutch arrangement, the clutches being operated by actuators, and the actuators being supplied alternately with hydraulic pressure via hydraulics and a bidirectional hydraulic pump. The clutches may be implemented both as dry clutches and as wet-running clutches. In this hydraulic arrangement, it is conceivable that the hydraulic pump is connected directly to the actuators.

Furthermore, the actuators may be connected to the hydraulic pump via valve arrangements.

According to the invention, electromagnetic clutches may also be employed, which are supplied from an electrical energy source.

In a particular embodiment, it is likewise conceivable that the system is designed partially or completely as a pneumatic system.

Moreover, it is to be noted that the torque distribution device may also serve for distributing the drive torque between two driven axles.

An alternative refinement of the hydraulic arrangement may serve for activating two clutches in a double clutch transmission.

It will be appreciated that the features mentioned above and those yet to be explained below can be used not only in the combination specified in each case, but also in other combinations or alone, without departing from the scope of the present invention.

DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
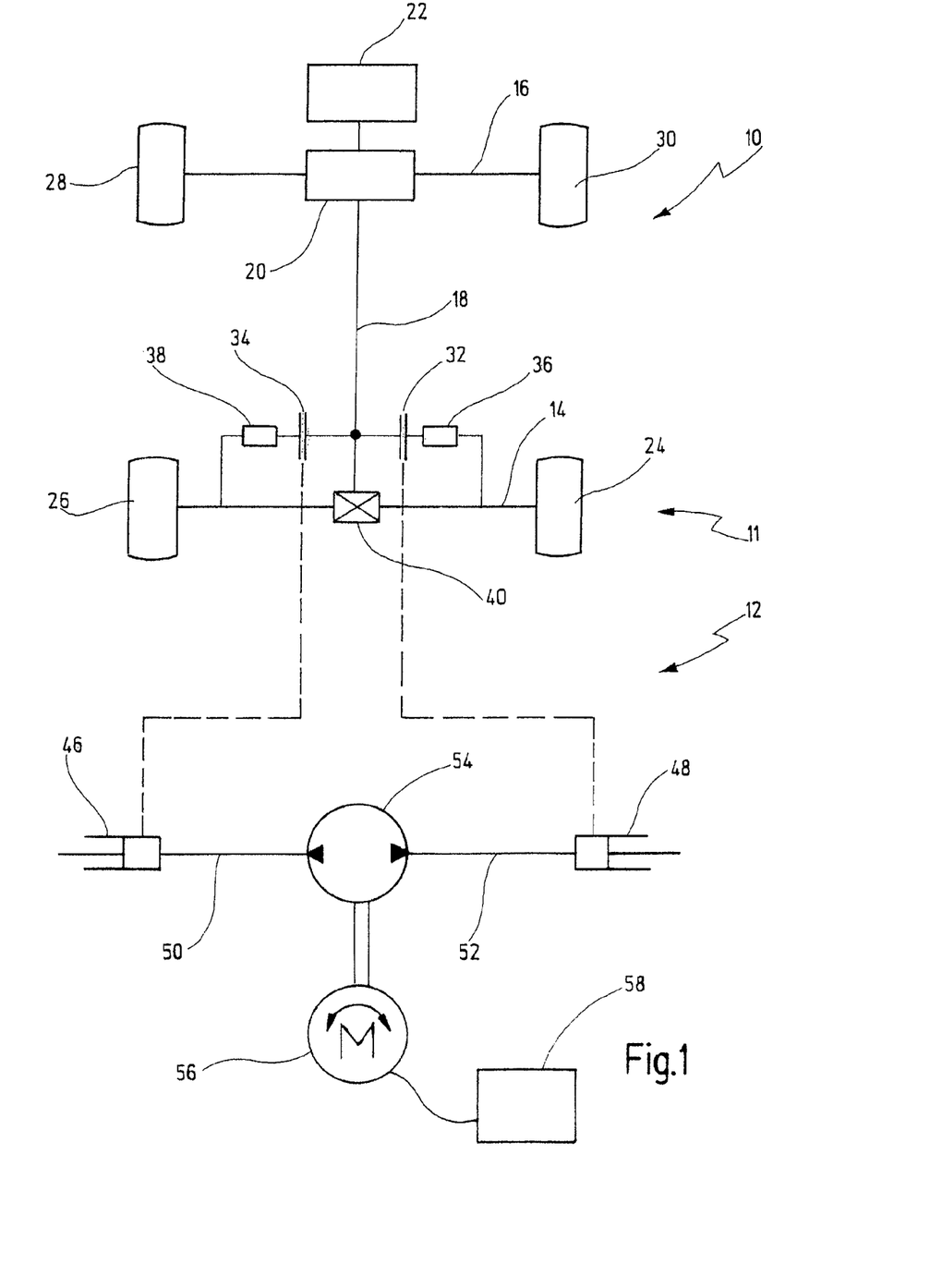
FIG. 1 shows a diagrammatic top view of a drive train for a motor vehicle and a hydraulic arrangement for clutch activation according to a first embodiment of the present invention.

In FIG. 1, a drive train is designated in general by 10 and contains an axle subassembly according to the invention which is designated in general by 11. A hydraulic arrangement according to the invention for torque distribution is illustrated diagrammatically at 12.

The drive train 10 serves for driving a motor vehicle, in particular a passenger car having at least two axles 14, 16, of which two axles 14, 16 are driven here by way of example. The rear axle 14 is connected to an engine 22 via a cardan shaft 18 and a transmission 20. The axle subassembly 11 is part of the rear axle 14.

The rear axle 14 has two driving wheels 24, 26 and the front axle 16 has two driving wheels 28, 30.

The axle subassembly 11 of the rear axle 14 has two clutches 32, 34, two rotational speed difference implementing devices 36, 38 and a differential 40 which serve for distributing the torque of the drive to the two wheels 24, 26 of the axle 14 and for generating a rotational speed error between the wheels 24, 26.

The axle subassembly 11 consequently serves as an "active-yaw" or "torque-vectoring" system, by means of which the yawing moment about the vertical axis of the motor vehicle can be actively influenced. The illustration shown is to that extent to be understood as being merely by way of example. Axle subassemblies for actively influencing the yawing moment by means of the set-up of a rotational speed difference between the wheels of an axle may also be configured in any other desired way. What is common to these systems is often that they have two clutches (such as the clutches 32, 34) which serve for increasing (or else reducing, depending on how you look at it) the rotational speed of the assigned driving wheel in relation to the other driving wheel.

In the axle subassembly 11 of FIG. 1, the drive torque of the engine 22 (for example, an internal combustion engine) is distributed by the differential 40 to the two wheels 24, 26 in a way which is conventional per se, wherein the differential 40 may be a "passive" mechanical differential.

Insofar as, for example, the rotational speed of the wheel 24 is to be increased, the assigned clutch 32 is closed, so that a connection between the cardan shaft 18 and driven wheel 24 is set up via the assigned rotational speed difference device 36.

In this case, the other wheel 26 receives drive power, as before, solely via the differential 40 which also compensates the deliberately set-up rotational speed error.

Since the wheel 24 consequently rotates more quickly than the wheel 26, cornering to the left can be actively assisted. In other words, the yawing moment in this direction can be actively influenced by means of the clutch 32.

The clutch 32 may in this case be designed as a type of shift clutch which sets up or does not set up the rotational speed error. However, the clutch 32 may also be designed as an adjustable clutch which can set a rotational speed error variably via its slip.

The two clutches 32, 34 are in this case activated alternately only.

Other active-yaw systems do not use any rotational speed difference devices, but use, instead of a mechanical differential 40, two friction clutches, by means of which the drive power apportioned to each driven wheel can be set individually. In these axle subassemblies, too, two clutches are used which are activated alternately.

The following description of the embodiment of FIG. 1 is therefore to be understood as being merely by way of example for this generic type of axle subassemblies.

The clutches 32, 34 of the axle subassembly 11 are opened or closed by a respective actuator 46, 48 of the hydraulic arrangement in order to control the torque distribution.

The actuators 46, 48 are connected via hydraulic connecting lines 50, 52 to a hydraulic pump 54 in order to be supplied with hydraulic pressure. The hydraulic pump 54 is driven by an electric motor 56 which is controlled via an electrical control unit 58.

The hydraulic pump 54 is designed as a bidirectional hydraulic pump and therefore, as a function of its direction of rotation, can alternately supply the actuator 48 with hydraulic pressure via the hydraulic connecting line 52 or supply the actuator 46 with hydraulic pressure via the hydraulic connecting line 50. The hydraulic pump 54 is driven by the electric motor 56, and the direction of rotation of the hydraulic pump 54 is also determined via the direction of rotation of the electric motor 56, with the result that it is also determined which of the two hydraulic connecting lines 50, 52 is supplied with hydraulic pressure and therefore which of the two actuators 46, 48 is actuated.

The actuators 46, 48 act on the clutches 32, 34 and can close or open these. Insofar as the electric motor 56 drives the hydraulic pump 54 such that the actuator 48 is supplied with hydraulic pressure via the hydraulic connecting line 52, the actuator 48 actuates the clutch 32 in the drive train 11, so that, in this particular embodiment, the clutch 32 is closed and a higher torque is transferred to the wheel 24.

Insofar as the drive torque transferred to the driving wheel 24 is to be reduced in the drive train 11 and, at the same time, the drive torque transferred to the driving wheel 26 is to be increased, for example in the event of a change in direction of travel, the direction of rotation of the electric motor 56 is reversed by the electrical control unit 58 and the direction of rotation of the bidirectional hydraulic pump 54 is thereby also changed. As a result, according to the invention, the actuator 46 is supplied with hydraulic pressure via the hydraulic connecting line 50 and closes the clutch 34, so that an increased drive torque is transferred to the driving wheel 26. Simultaneously, the hydraulic pressure in the hydraulic connecting line 52 falls, since, in this particular embodiment, the hydraulic pump 54 sucks the hydraulic oil out of the hydraulic connecting line 52. Owing to the reduced hydraulic pressure in the hydraulic control line 52, the clutch 32 is opened by the actuator 48.

In this embodiment of the invention, therefore, the clutches 32, 34 can be opened or closed alternately as a result of the reversal in direction of rotation of the electric motor 56, and the drive torque transferred to the driving wheels 24, 26 can thus be varied.

Figure 2:
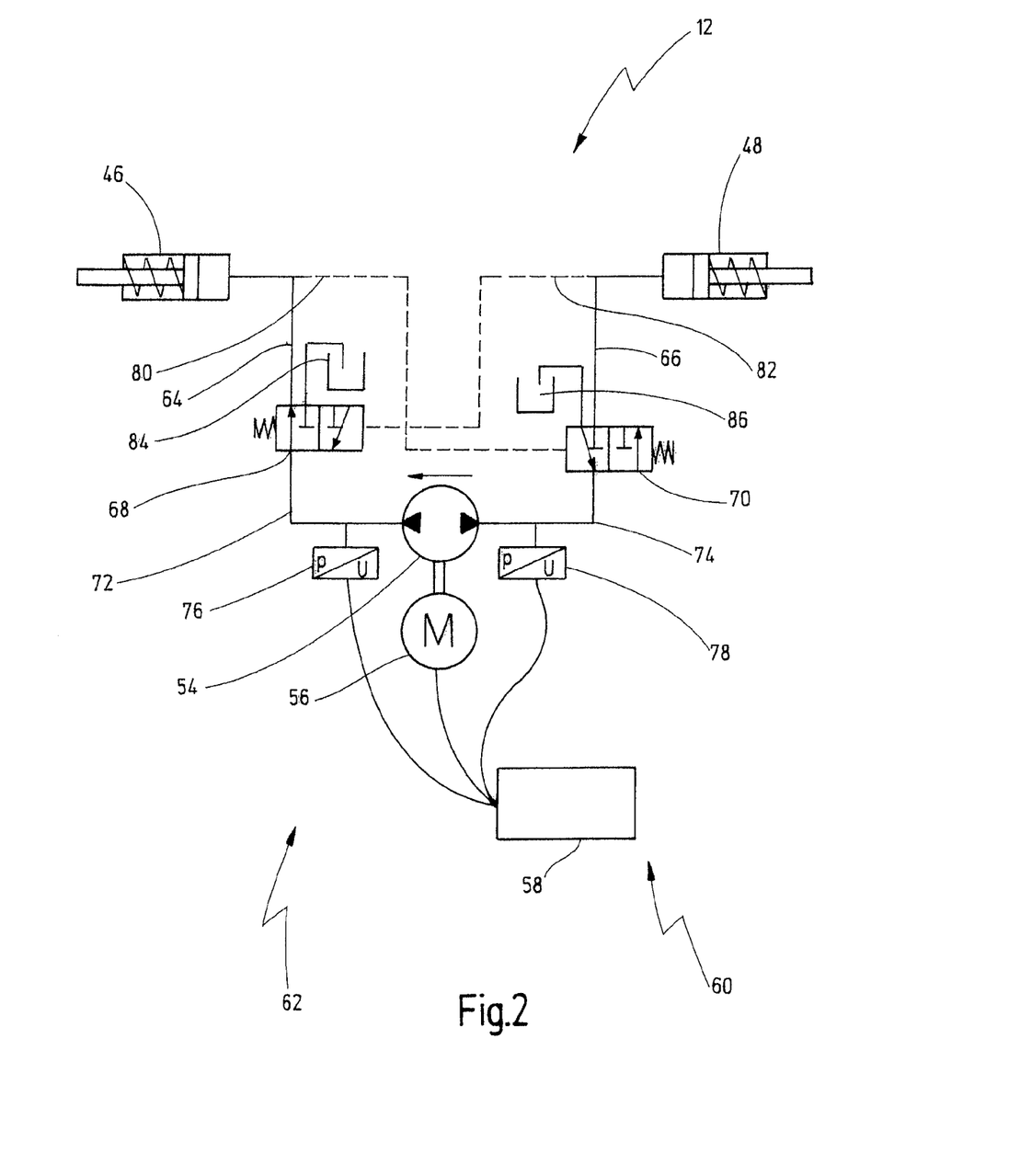
FIG. 2 shows a diagrammatic illustration of an embodiment of a hydraulic arrangement according to the invention.

FIG. 2 shows a further embodiment of the hydraulic arrangement 12 for controlling the torque distribution in a drive train 10 of a motor vehicle. It consists of two symmetrical hydraulic circuits 60, 62, and two actuators 46, 48 which in each case are connected via a hydraulic line 64, 66 to a directional valve 68, 70 which valves are in each case connected via a hydraulic connecting line 72, 74 to a single bidirectional hydraulic pump 54. The bidirectional hydraulic pump 54 is driven by an electric motor 56. The hydraulic connecting lines 72, 74 are connected in each case to a pressure transducer 76, 78 connected to an electronic control unit 58.

In this embodiment, the hydraulic lines 64, 66 are in each case connected via a hydraulic control line 80, 82 to a directional valve 68, 70. The hydraulic control lines 80, 82 are arranged such that they in each case connect a hydraulic line 64, 66 to a directional valve 68, 70 of the opposite symmetrical hydraulic circuit 60, 62.

Furthermore, the directional valves 68, 70 are connected in each case to an oil sump 84, 86. In the exemplary embodiment, for example, the directional valve 68 in a first position connects the delivery side of the hydraulic pump 54 to an actuator 46. According to the invention, the pressure in the hydraulic line 64 is fed back via the hydraulic control line 80 to the directional valve 70 of the opposite hydraulic circuit 60, with the result that the directional valve 70 is changed over into a second position in which it connects the suction side of the hydraulic pump 54 to the oil sump 86.

According to the invention, the pressure in the hydraulic control lines 80, 82, which is necessary for switching the directional valves 68, 70, is substantially lower than the pressure in the hydraulic lines 64, 66, which is necessary for operating the actuators 46, 48. In a particular embodiment, without any hydraulic pressure in the hydraulic control line 80, 82, that is to say with the hydraulic pump 54 switched off, the directional valves 68, 70 are in the first position (position of rest) on account of spring tension, so that they connect the hydraulic pump 54 to both actuators 46, 48.

As a result, in this particular embodiment according to the invention, the hydraulic pump 54, irrespective of its direction of rotation, is always connected on the delivery side to one of the actuators 46, 48 and, due to the fed-back pressure which changes over the directional valves 68, 70 into the second position, is always connected on the suction side to at least one oil sump 84, 86.

In FIG. 2, the hydraulic arrangement 12 is illustrated such that the hydraulic pump 54 supplies the left hydraulic circuit 62 with hydraulic pressure.

Since, in the position of rest, the directional valve 68 connects the hydraulic pump 54 to the actuator 46, the hydraulic pressure generated by the hydraulic pump 54 is conducted directly to the actuator 46. According to the invention, the hydraulic pressure in the hydraulic line 64 is fed back via the hydraulic control line 80 to the directional valve 70 and switches the latter out of the position of rest into a second position, so that the hydraulic pump 54 is connected on the suction side to the oil sump 86. In this state of the hydraulic arrangement, the actuator 46 is actuated by the hydraulic pressure in the hydraulic line 64 and, for example, closes the clutch 34 in FIG. 1.

If, then, the direction of rotation of the electric motor 56 is reversed by the electrical control unit 58, the direction of rotation of the hydraulic pump 54 also changes. The delivery side and suction side of the hydraulic pump 54 are thereby interchanged, so that the hydraulic circuit 62 is connected to the suction side of the hydraulic pump 54. As a result, the hydraulic pressure in the overall hydraulic circuit 62, and therefore also in the hydraulic control line 80, is reduced. The directional valve 70 is thereby changed over into the position of rest again, so that the hydraulic pump 54 is connected to the actuator 48.

According to the direction of rotation of the hydraulic pump, then, the hydraulic circuit 60 is supplied with hydraulic pressure, so that the hydraulic pressure in the hydraulic connecting line 66 rises and actuates the actuator 48. The hydraulic pressure in the hydraulic control line 82 thereby also rises, with the result that the directional valve 68 is switched out of the position of rest into the second position, so that the hydraulic pump 54 is connected to the oil sump 84. By the direction of rotation of the electric motor 56 being reversed, the actuators 46, 48 can thus be actuated alternately.

Figure 3:
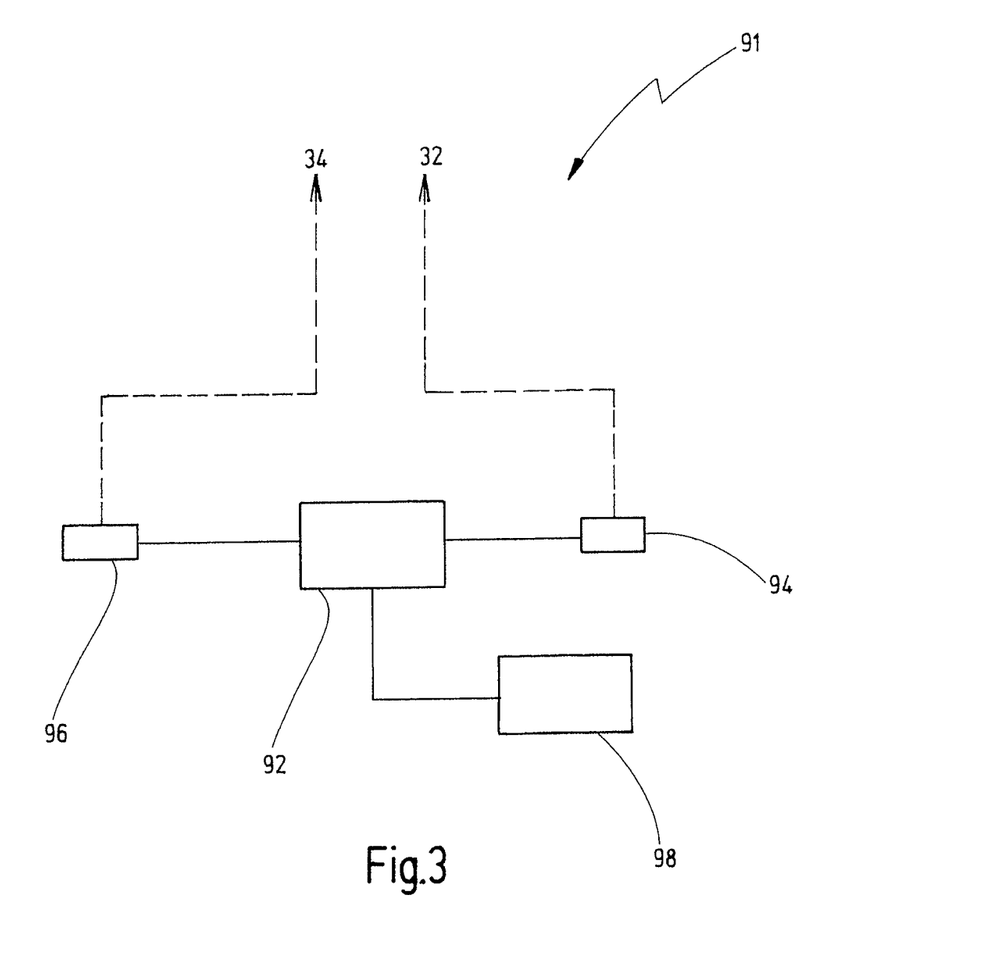
FIG. 3 shows a diagrammatic illustration of an embodiment for the activation of two clutches by means of one electrical energy source.

FIG. 3 illustrates an embodiment of an electrical control arrangement which is designated in general by 91. It serves for activating two clutches 32, 34 by means of one electrical drive source 92.

The electrical drive source 92 is connected to two actuators 94, 96 which, for example, actuate the clutches 32, 34 from FIG. 1. The electrical drive source 92 is connected to an electronic control unit 98 and is controlled via the latter.

The electrical drive source 92 can actuate the actuator 96 or the actuator 94 alternately. Since these two actuators are connected to the clutches 32, 34, the clutches 32, 34 can be opened and closed alternately simply by the reversal in direction of action of the electrical drive source 92.

Figure 4:
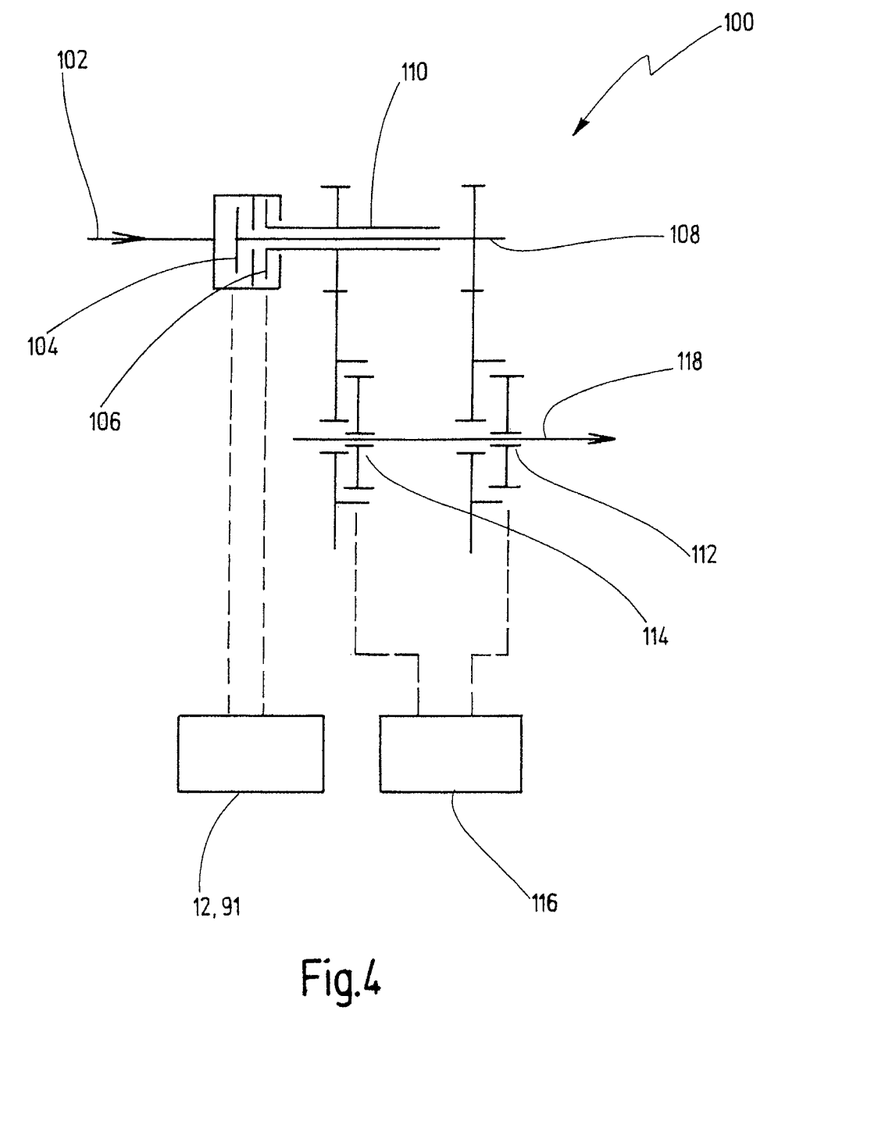
FIG. 4 shows a diagrammatic illustration of a double-clutch transmission for a motor vehicle according to a particular embodiment of the present invention.

FIG. 4 illustrates diagrammatically a double clutch transmission 100 of a motor vehicle according to a particular embodiment of the present invention. The double clutch transmission 100 has an input shaft 102 which is connected to a first isolating clutch 104 and a second isolating clutch 106. In this embodiment, the isolating clutches 104, 106 are controlled by a hydraulic arrangement 12 according to the invention or an electrical control arrangement 91 according to the invention. Furthermore, the first isolating clutch 104 is connected to a first transmission input shaft 108 and the second isolating clutch 106 is connected, furthermore, to a second transmission input shaft 110. The transmission input shafts 108, 110 are assigned to two partial transmissions and can be connected to a transmission output shaft 118 via respective wheel sets and shift clutches 112, 114 which are controlled via a control unit 116.

In order to execute a load change in a double clutch transmission of this embodiment, the torque transmitted from the input shaft 102 to the output shaft 118 is transferred from one partial transmission to the other partial transmission. This is executed by means of the engagement and disengagement of the isolating clutches 104 and 106 which are connected in each case to the transmission input shafts 108, 110 and the input shaft 102. In a particular embodiment of the invention, the overlapping engagement and disengagement of the isolating clutches 104, 106 which are connected to the actuators 46, 48 takes place via the reversal in direction of rotation of the hydraulic arrangement 12 of FIG. 1 or 2 or of the electrical control device 91 of FIG. 3. By the reversal in direction of rotation, for example, the hydraulic pressure acting on one of the actuators 46, 48 is reduced and the pressure acting on the other actuator 46, 48 in each case is increased. As a result, one of the isolating clutches 104, 106 is opened and the other isolating clutch 104, 106 is closed.

What is claimed is:

1. Hydraulic arrangement for the activation of two actuators, with a hydraulic pressure supply unit which is assigned jointly to the two actuators, wherein the hydraulic pressure supply unit is designed to be reversible in its direction of action, so that, depending on the direction of action, only one of the actuators is driven in an expanding direction, wherein each of the actuators is associated with a valve arrangement, and which is provided to connect a suction side of the hydraulic pressure supply unit to an oil sump, wherein the valve arrangements are designed as directional valves, which connect the hydraulic pressure supply unit in a first position to the respective actuator and, in a second position, to the oil sump, and wherein a hydraulic pressure, which is fed to one of the actuators, is fed back to that directional valve, which is assigned to the other actuator, to actuate that directional valve towards the second position to provide a connection between the oil sump and the hydraulic pressure supply unit through that directional valve.

2. Hydraulic arrangement according to claim 1, wherein the pressure supply unit is designed as a hydraulic pump.

3. Hydraulic arrangement according to claim 2, wherein the hydraulic pump is designed to be driveable bidirectionally, so that a delivery side and the suction side are interchangeable.

4. Hydraulic arrangement according to claim 2, wherein the hydraulic pressure generated by the hydraulic pump is measured by pressure transducers.

5. Hydraulic arrangement according to claim 2, wherein the hydraulic pump is connected to two symmetrical hydraulic circuits.

6. Hydraulic arrangement according to claim 2, wherein the valve arrangements connect the hydraulic pump to the actuators in the position of rest.

7. Hydraulic arrangement according to claim 1, wherein the pressure supply unit is driven by an electric motor.

8. Hydraulic arrangement according to claim 7, wherein the reversal in direction of action of the pressure supply unit takes place by means of the reversal in direction of rotation of the electric motor.

9. Hydraulic arrangement according to claim 7, wherein the electric motor is controlled by an electrical control unit.

10. Hydraulic arrangement according to claim 9, wherein the hydraulic pressure generated by the pressure supply unit is feed-back controlled by means of the electrical control unit.

11. Hydraulic arrangement according to claim 7, wherein the hydraulic pressure generated by the pressure supply unit is indirectly feed-back controlled via the rotational speed of the electric motor.

12. Hydraulic arrangement according to claim 7, wherein the hydraulic pressure generated by the pressure supply unit is indirectly feed-back controlled via the torque of the electric motor.

13. Hydraulic arrangement according to claim 7, wherein the hydraulic pressure generated by the pressure supply unit is indirectly feed-back controlled via the electrical current of the electric motor.

14. Hydraulic arrangement according to claim 1, wherein the actuators are designed as piston/cylinder units.

15. Hydraulic arrangement according to claim 1, wherein the valve arrangements are designed to be directly actuated hydraulically.

16. Hydraulic arrangement according to claim 1, wherein the fed-back hydraulic pressure changes the respective valve arrangement into the second position, so that the pressure supply unit is connected to the oil sump.

17. Hydraulic arrangement according to claim 1, wherein the hydraulic pressure necessary for switching the directional valves is lower than the hydraulic pressure fed to the actuators for activation.

* * * * *

UNITED STATES PATENT AND TRADEMARK OFFICE
CERTIFICATE OF CORRECTION

PATENT NO. : 8,938,958 B2  
APPLICATION NO. : 11/958323  
DATED : January 27, 2015  
INVENTOR(S) : Hans-Peter Nett Page 1 of 1

It is certified that error appears in the above-identified patent and that said Letters Patent is hereby corrected as shown below:

In the Specification

In column 1 at line 8, change "DE 10 2006 161 516" to --DE 10 2006 061 516--.

Signed and Sealed this  
Fifth Day of January, 2016

Michelle K. Lee  
*Director of the United States Patent and Trademark Office*